INVENTORS
WILLIAM G. BLODGETT
FRANCIS M. CUMMINGS
WALTER H. FLEMING

BY Elliott & Pastoriza
ATTORNEYS

United States Patent Office 3,116,428
Patented Dec. 31, 1963

3,116,428
FORCE RESPONSIVE ELECTRICAL IMPULSE
GENERATOR
William G. Blodgett, Redondo Beach, and Francis M. Cummings and Walter H. Fleming, Los Angeles, Calif., assignors to Space Equipment Corporation, Torrance, Calif., a corporation of California
Filed Oct. 16, 1961, Ser. No. 145,369
1 Claim. (Cl. 310—15)

This invention relates generally to impulse generators and more particularly to a novel impulse generator for supplying a pulse of electrical energy in response to a given force.

In many instances, it is desirable to provide an electrical pulse of energy to effect various operations automatically in response to a given force. For example, it may be desirable to separate two sections of a missile by means of explosive bolts detonated by an impulse of electrical energy under a certain physical condition such as a given acceleration or deceleration. In other instances, it may be desirable to release a parachute from a drone or crate upon impact with the ground, or to provide a pulse of electrical energy to operate cameras or other equipment at the time of a given impact.

Accordingly, it is a primary object of this invention to provide an electrical impulse generating device which will provide a pulse of electrical energy in response to a force.

More particularly, it is an object to provide a device for supplying an impulse of electrical energy only when a given force along a given axis of the device is equalled or exceeded.

More general objects of this invention are to provide a novel impulse generating device meeting the foregoing objects which is extremely reliable, rugged in construction, and may be manufactured relatively economically.

Briefly, these and other objects and advantages of this invention are attained by providing a container structure including means for mounting the structure so that it will be positioned with its sensitive axis in alignment with a direction in which any given sudden force to which the device is to be responsive acts. For example, in the case of effecting an automatic release of a parachute, the device would be gimbal mounted so that the axis would be vertical and responsive to striking of the ground which would subject the device to a sudden "g" loading sufficient to effect the desired operation.

Within the container there is provided a stationary magnetic member, a movable magnetic member and electrical windings. The movable magnetic member is held by magnetic attraction to the stationary member with a given force and in a position in flux coupling relationship with the electrical windings. The windings themselves are stationarily secured. With this arrangement, the movable member will break away from the stationary member when the casing is subjected to a given force along the axis of movement of the movable magnetic member, the resulting relative motion between the movable magnetic member and the windings resulting in generation of an impulse of electrical energy.

The required degree of force or "g" loading to effect breaking away of the movable member from the stationary member may be adjusted by pre-loading the movable member with a separation force provided by a spring or equivalent structure included within the container.

A better understanding of the invention will be had by referring to one example thereof as illustrated in the accompanying drawings, in which.

Figure 1:
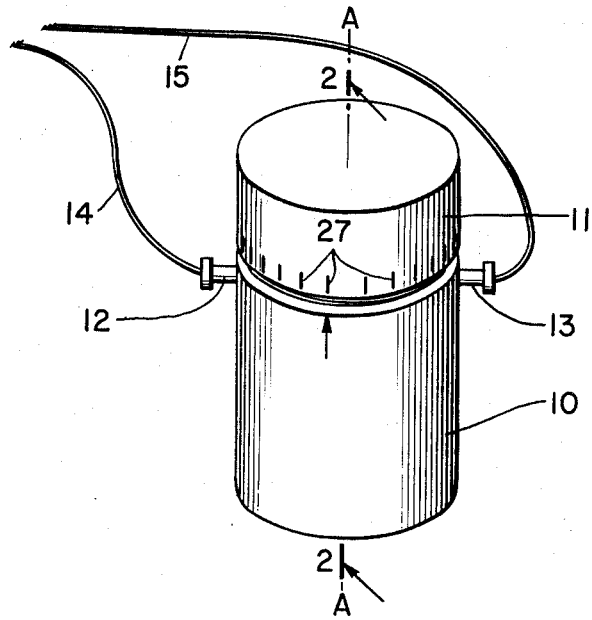
FIGURE 1 is an overall perspective view of one embodiment of the impulse generator.

Referring first to FIGURE 1, the impulse generator includes a cylindrical container 10 having a sensitive axis A—A and provided with a cover 11 to provide access to the interior thereof. Also shown are first and second mounting pins 12 and 13 disposed on diametrically opposite sides of the container 10. These pins receive suitable yoke structures so that the container 10 will remain vertically upright if it is desired that its sensitive axis be aligned with the gravitational field of the earth.

Output leads 14 and 15 extend from the extreme ends of the mounting pins 12 and 13 as shown. These output leads serve to carry an electrical pulse when the impulse generator is operated, this pulse in turn being employed to trigger auxiliary circuits.

Figure 2:
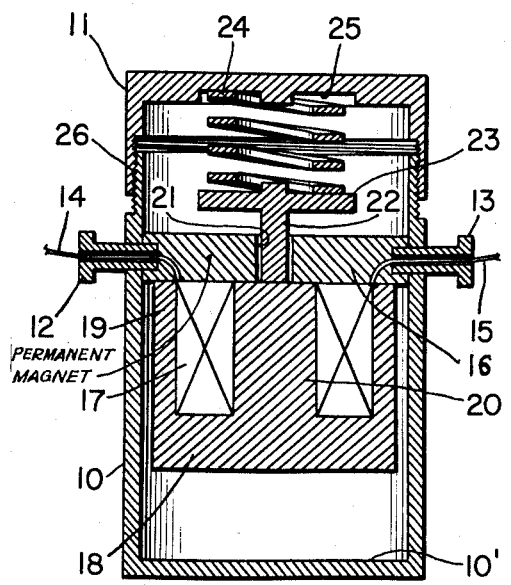
FIGURE 2 is a cross section taken in the direction of the arrows 2—2 of FIGURE 1 illustrating components within the container in a first position; and, FIGURE 3 is a view similar to FIGURE 2 illustrating the components in a second position after the device has been operated.
Figure 3:
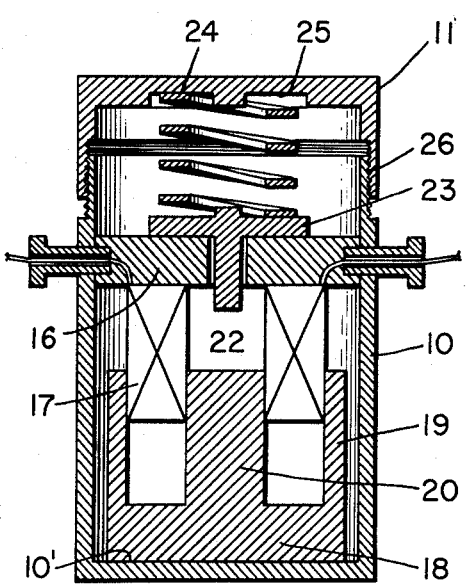

Referring now to the detailed views of FIGURES 2 and 3, within the container 10 there is provided a stationary magnetic member 16 secured in rigid relationship to the inside walls of the container. Windings 17 are stationarily secured with respect to the member 16 and include output terminals connecting to the output leads 14 and 15 as shown.

A movable magnetic member 18 includes outer walls 19 defining a general cup shape and a central core 20. The windings 17 are received within the annular space between the walls and core when the movable magnetic member 18 is in a first position in magnetic contact with the stationary magnetic member 16. The magnetic member 16 serves to complete the magnetic flux path from the outer walls 19 of the movable member 18 through the center core 20. The movable magnetic member 18 is held to the magnetic member 16 by magnetic attraction of the upper peripheral edges of the outer walls 19 and the upper end of the central core 20.

With only the magnetic attraction between the members 16 and 20 holding the same together, it will be evident that if the container is subjected to a sufficient force along its vertical axis in an upward direction, the inertia of the member 18 will result in separation from the magnetic member 16. The degree of force required for this separation will depend upon the mass of member 18 and the strength of magnetic attraction between the members 16 and 18. This strength may be varied by applying a biasing or pre-loading force to the magnetic member 18 tending to separate it from the member 16.

The foregoing may be achieved by providing a central bore 21 in the member 16 through which a movable pin 22 extends. The pin 22 includes an annular flange 23 which serves to seat a spiral spring 24. The upper end of the spring 24 in turn is confined within an annular indent 25 in the cover 11. The cover is threaded at 26 to the container so that downward threading of the cover will compress the spring 24 with respect to the flange 23. It will be evident that with this arrangement the degree of threading down of the cover 11 will determine the force exerted by the spring 24 against the flange 23 and thus the force tending to separate the member 18 from the member 16. A scale 27 as shown in FIGURE 1 may be provided to indicate the degree of pre-loading.

FIGURE 2 illustrates the relative position of the members 16 and 18 after the same have been separated as a consequence of an impact force directed along the axis A—A of the device. When the member 18 moves from the position illustrated in FIGURE 2 to the released position illustrated in FIGURE 3, the windings 17 will have cut the flux lines in the magnetic circuit, thereby resulting in a generation of an impulse of electrical energy in the windings which will pass out the leads 14 and 15 to operate any suitable apparatus as required.

After the device has been released or is in the position illustrated in FIGURE 3, it may be reused by simply removing the cover 11 and retracting the pin 22 to permit the magnetic member 18 to fall against the member 16 when the device is turned upside down. The member 18 will remain in position by magnetic attraction until another impact is received.

From the foregoing description, it will be evident that the present invention has provided a novel impulse generator which is responsive to a given force or "g" loading directed along a given axis. Further, it will be evident from the foregoing description that there is provided a means which enables the degree of force necessary to operate the device to be adjusted in accordance with particular applications of the impulse generator.

The term "magnetic" member as applied to the members 16 and 18 in this specification as well as the claims is meant to include members composed of magnetic material such as soft iron or permanently magnetized material or a combination of both. For example, while the member 18 is shown as a single piece, the central core 20 need only constitute a permanent magnet and the remaining portions 18 and 19 constitute soft iron.

Other minor modifications resulting in equivalent structures that fall clearly within the scope and spirit of this invention will occur to those skilled in the art. The impulse generator is therefore not to be thought of as limited to the specific embodiment set forth merely for illustrative purposes.

What is claimed is:

An impulse generator comprising, in combination: a cylindrical container; a stationary magnetic member extending transversely of said container and rigidly secured to the sidewalls of the container; electrical windings secured to said stationary magnetic member; a movable magnetic member having a general cup-shaped configuration with a central upwardly extending core, one of said magnetic members being permanently magnetized, said movable magnetic member receiving said windings within its sidewalls and over its core in flux coupling relationship and being held to said stationary magnetic member by magnetic force, magnetic flux passing between said central core and magnetic member and the periphery of said cup-shaped configuration and said magnetic member; and means for adjusting the degree of force holding said movable magnetic member against said stationary magnetic member, said means comprising a compression spring tending to separate said movable magnetic member from said stationary magnetic member, one end of said compression spring bearing against the end of said central core; and screw means movable with respect to said stationary magnetic member, said screw means being held on said container and engaging said spring to change the compression force exerted by said spring upon threading movement, whereby a given force exceeding said given degree of force causes separation of said movable magnetic member from said stationary magnetic member so that an air gap is established between said central core and the periphery of said cup-shaped configuration relative to said stationary magnetic member to generate an impulse of electrical energy in said coils.

References Cited in the file of this patent
UNITED STATES PATENTS

| | | |
|---|---|---|
| 2,775,941 | Plumley | Jan. 1, 1957 |
| 2,779,277 | Smith | Jan. 29, 1957 |
| 2,820,411 | Park | Jan. 21, 1958 |